(12) United States Patent
Liebherr et al.

(10) Patent No.: US 7,661,351 B2
(45) Date of Patent: Feb. 16, 2010

(54) HYDROSTATIC AXIAL PISTON MACHINE AND USE OF SAID MACHINE

(75) Inventors: Markus Liebherr, Bulle (CH); Josef Häglsperger, Gangkofen (DE); Peter Dziuba, Frickingen-Altheim (DE); Josef Bauer, Nandlstadt (DE); Johann Federholzner, Eichendorf (DE)

(73) Assignee: MALI Holding AG, Fribourg (CH)

( * ) Notice: Subject to any disclaimer, the term of this patent is extended or adjusted under 35 U.S.C. 154(b) by 305 days.

(21) Appl. No.: 11/665,896

(22) PCT Filed: Oct. 20, 2005

(86) PCT No.: PCT/CH2005/000613

§ 371 (c)(1),
(2), (4) Date: Apr. 19, 2007

(87) PCT Pub. No.: WO2006/042435

PCT Pub. Date: Apr. 27, 2006

(65) Prior Publication Data

US 2007/0261547 A1 Nov. 15, 2007

(30) Foreign Application Priority Data

Oct. 20, 2004 (CH) .................................. 1734/04

(51) Int. Cl.
*F01B 13/04* (2006.01)
*F01B 3/00* (2006.01)
(52) U.S. Cl. ................................. 92/12.2; 91/505; 92/57
(58) Field of Classification Search ................... 92/12.2, 92/57, 58; 91/504, 505; 417/222.1, 269
See application file for complete search history.

(56) References Cited

U.S. PATENT DOCUMENTS 3,775,981 A 12/1973 Molly
4,920,860 A * 5/1990 Alm et al. ..................... 91/504

(Continued)

FOREIGN PATENT DOCUMENTS

DE 1113 621 9/1961

(Continued)

OTHER PUBLICATIONS

H Bork, et al., "Modellbildung, Simulation and Analyse eincs stufenlosen leistungsverzweigten Traktorgetriebes", Tagungsband Simulation Im Maschinebau, Institut Fur Werkzeugmaschinen, Tu-Dresden, 2000, pp. 329-348, XP002330254.

*Primary Examiner*—Michael Leslie
(74) *Attorney, Agent, or Firm*—Pauley Petersen & Erickson (57) ABSTRACT

The invention relates to a hydrostatic axial piston machine having a cylinder block which can be rotated about a first axis, the cylinder block being provided with a plurality of cylinder bores which extend in the axial direction and which are arranged on a partial circle which is concentric in relation to the first axis, in addition to a plane which can be rotated about a second axis, whereon a number of pistons associated with the bores, can be articulated in a pivotable manner on a second partial circle which is concentric in relation to the second axis and form a ring. Also provided is a device for synchronizing the rotation of the cylinder block about the first axis and the drive shaft about the second axis. The cylinder block and the drive shaft can be adjusted in a continuous manner using both axes, between a first position, wherein both axes are parallel, and a second position, wherein both axes together form a maximum pivoting angle which is different from zero.

4 Claims, 10 Drawing Sheets

U.S. PATENT DOCUMENTS

| | | | | |
|---|---|---|---|---|
| 5,584,772 | A * | 12/1996 | Hayd | 475/72 |
| 6,283,721 | B1 * | 9/2001 | Gollner | 92/12.2 |
| 6,505,541 | B2 * | 1/2003 | Skirde et al. | 92/12.2 |
| 6,520,066 | B2 * | 2/2003 | Skirde et al. | 92/12.2 |
| 6,604,446 | B1 * | 8/2003 | Skirde et al. | 92/12.2 |
| 2004/0173089 | A1 * | 9/2004 | Gray et al. | 91/505 |

FOREIGN PATENT DOCUMENTS

| | | |
|---|---|---|
| DE | 29 04 572 | 2/1979 |
| DE | 3707382 | 9/1988 |
| DE | 3800031 | 7/1989 |
| DE | 4343401 | 4/1994 |
| DE | 19833711 | 2/2000 |
| DE | 10044784 | 4/2002 |
| EP | 1 195 542 A1 | 4/2002 |
| EP | 1 201 925 A2 | 5/2002 |
| JP | 61-116079 | 3/1986 |
| WO | WO 2004/081380 A2 | 9/2004 |

* cited by examiner

HYDROSTATIC AXIAL PISTON MACHINE AND USE OF SAID MACHINE

BACKGROUND OF THE INVENTION

1. Field of the Invention

The present invention relates to the field of axial piston machines. It refers to a hydrostatic axial piston machine according to the preamble of claim 1 and to the use of said machine.

2. Description of Related Art

Continuously variable hydrostatic power-branched transmissions, particularly in vehicles used for construction or agricultural purposes, have long been known from the prior art (see, for example, the publications DE-AS-1 113 621, DE-C2-29 04 572, DE-A1-37 07 382, DE-A1-43 43 401 and EP-A1-1 195 542). In these transmissions, the transferred power is apportioned to a mechanical branch and a hydrostatic branch of the transmission as a function of the driving speed, transferred and subsequently combined again.

The hydrostatic power transfer branch of the transmission comprises conventionally two hydrostatic axial piston machines which are connected hydraulically to one another and one of which operates in each case as a pump and the other as a motor. The two machines can in this case interchange their roles, depending on the driving step.

The hydrostatic axial piston machines constitute an essential component of the hydrostatic power-branched transmission and decisively influence the properties of the transmission, such as, for example, the efficiency, the overall size, the complexity, the speed range covered, the type and number of driving steps and the like. Examples of hydrostatic axial piston machines of this type are disclosed in DE-A1-198 33 711 or DE-A1-100 44 784. The functioning and theory of the hydrostatic axial piston machines and a power-branched tractor transmission equipped with them are described in a publication of TU Munich from the year 2000 by H. Bork et al., "Modellbildung, Simulation und Analyse eines stufenlosen leistungsverzweigten Traktor-getriebes" ["Modeling, simulation and analysis of a continuously variable power-branched tractor transmission"].

In the hydrostatic axial piston machines, the cylinder block, into which the axial pistons penetrate, can be pivoted with respect to the driving flange, on which the axial pistons are mounted pivotably, over a pivot angle out of the axially parallel basic configuration. Depending on the pivot angle, in the case of a constant rotational speed, an axial piston machine operating as a pump conveys more or less volume per unit time. In an axial piston machine operating as a motor, the pivot angle influences the torque output and the rotational speed. Owing to the cooperation of two axial piston machines operating as a pump and as a motor in a power-branched transmission, the driving speed can be set independently of the engine rotational speed of the driving internal combustion engine, in that the pivot angles of the pump and motor are suitably varied. Thus, in a tractor, it is possible, for example, in spite of a changing driving speed, to keep the rotational speed of the diesel engine constant and to operate the engine at the most beneficial operating point, or to adapt the rotational speed of the take-off shaft optimally to the work task of the accessory driven by means of the take-off shaft.

The maximum possible pivot angle of the axial piston machine determines the operating range of the axial piston machine and therefore also the properties of the transmission. In axial piston machines known hitherto, the maximum pivot angle is restricted to values equal to or lower than 45°. This leads to a restriction in power and in the range of variation. The result of this, too, is that the power-branched transmissions in which the axial piston machines are used are restricted in efficiency, cover a restricted speed range per driving step and entail a comparatively high outlay in terms of construction and space requirement.

The object of the invention, therefore, is to provide a hydrostatic axial piston machine which is distinguished by markedly improved properties, as compared with the known axial piston machines, and, when used in a power-branched transmission, leads to corresponding improvements in the transmission properties.

SUMMARY OF THE INVENTION

The object is achieved by means of the whole of the features of claim 1. The essence of the invention is, in the axial piston machine, to provide a maximum pivot angle of greater than 45°, in particular equal to or greater than 50°. By the maximum pivot angle being increased, the efficiency of the machine is improved. At the same time, the spread is increased, that is to say, in the case of a constant rotational speed, a broadened operating range is obtained. Furthermore, with the overall size being the same, the power is increased or, with the power being the same, a reduced overall size becomes possible. These improvements in the individual axial piston machine also lead to corresponding improvements in a power-branched transmission equipped in such machines.

A preferred refinement of the hydrostatic axial piston machine according to the invention is distinguished in that the rotatable plane is arranged at one end of a driven shaft rotating about the second axis, in that the synchronizing means comprise a central synchronizing shaft which is arranged within the belt of pistons and which is in rotationally fixed engagement at one end via a first joint with the driven shaft and at the other end by a second joint with the cylinder block, and in that in order to achieve a pivot angle different from zero, the synchronizing shaft is pivotable on all sides in a central funnel-shaped orifice of the driven shaft, said orifice being arranged within the belt of pistons, in such a way that the maximum pivot angle of the machine is decisively determined by the size and configuration of the funnel-shaped orifice and of the cross section of the synchronizing shaft, the first and the second joint being designed in each case as a tripod joint, the synchronizing shaft being mounted axially displaceably in the drive shaft in order to compensate distance changes in the event of changes in the pivot angle, and means being provided in the drive shaft which prestress the synchronizing shaft resiliently in the direction of the cylinder block, and the prestressing means comprising an axial compression spring which exerts pressure via a pressure piston and a first pressure pin connected pivotably to one end of the synchronizing shaft, and the synchronizing shaft being supported at the other end, via a second pressure pin connected pivotably to it, on the cylinder block.

In a hydrostatic axial piston machine designed in this way, to increase the maximum pivot angle, preferably the funnel-shaped orifice is widened locally in each case between adjacent pistons by means of bulges, and the cross-sectional contour of the synchronizing shaft is adapted to the bulges. The bulges may basically have various forms, insofar as, in conjunction with the adapted cross-sectional contour of the synchronizing shaft, they lead to the synchronizing shaft being capable of being pivoted outward to a greater extent. It is particularly beneficial if, according to a preferred further development, the edge contour of the funnel-shaped orifice is a polygon with a number of corners corresponding to the number of pistons, and if the corners of the polygon are arranged in each case between adjacent pistons and form a bulge.

In particular, a number of pistons divisible by 3 may be provided, and the cross-sectional contour of a synchronizing shaft may have a rotational symmetry which merges into itself as a result of rotation through 120°, the 120° rotational symmetry of the cross-sectional contour of the synchronizing shaft being generated by three groove-shaped bulges in the synchronizing shaft which run in the axial direction and are arranged in each case so as to be rotated through 120°. Preferably, in this case, 9 pistons are provided.

A further refinement of the hydrostatic axial piston machine according to the invention is characterized in that the pistons are arranged in each case at one end of a piston shank, in that the piston shank tapers toward the other end and at the other end is mounted pivotably with a spherical head in a spherical bearing, in that the spherical bearings are fastened on the second reference circle in a flange formed on the driven shaft and forming the plane rotatable about the second axis, and in that the pistons, the piston shanks and the spherical heads are in each case parts of a one-piece element.

According to the invention, the hydrostatic axial piston machine according to the invention is used in a power-branched transmission of a vehicle, in particular a tractor, driven by an internal combustion engine, part of the drive power transferred by the power-branched transmission being transferred hydraulically, and, for the hydraulic power transfer, at least two hydrostatic axial piston machines connected hydraulically to one another being used, which operate alternately as a pump and as a motor.

Further embodiments may be gathered from the dependent claims.

BRIEF DESCRIPTION OF THE DRAWINGS

The invention will be explained in more detail below by means of exemplary embodiments, in conjunction with the drawing in which.

DETAILED DESCRIPTION OF THE INVENTION

Figure 1:
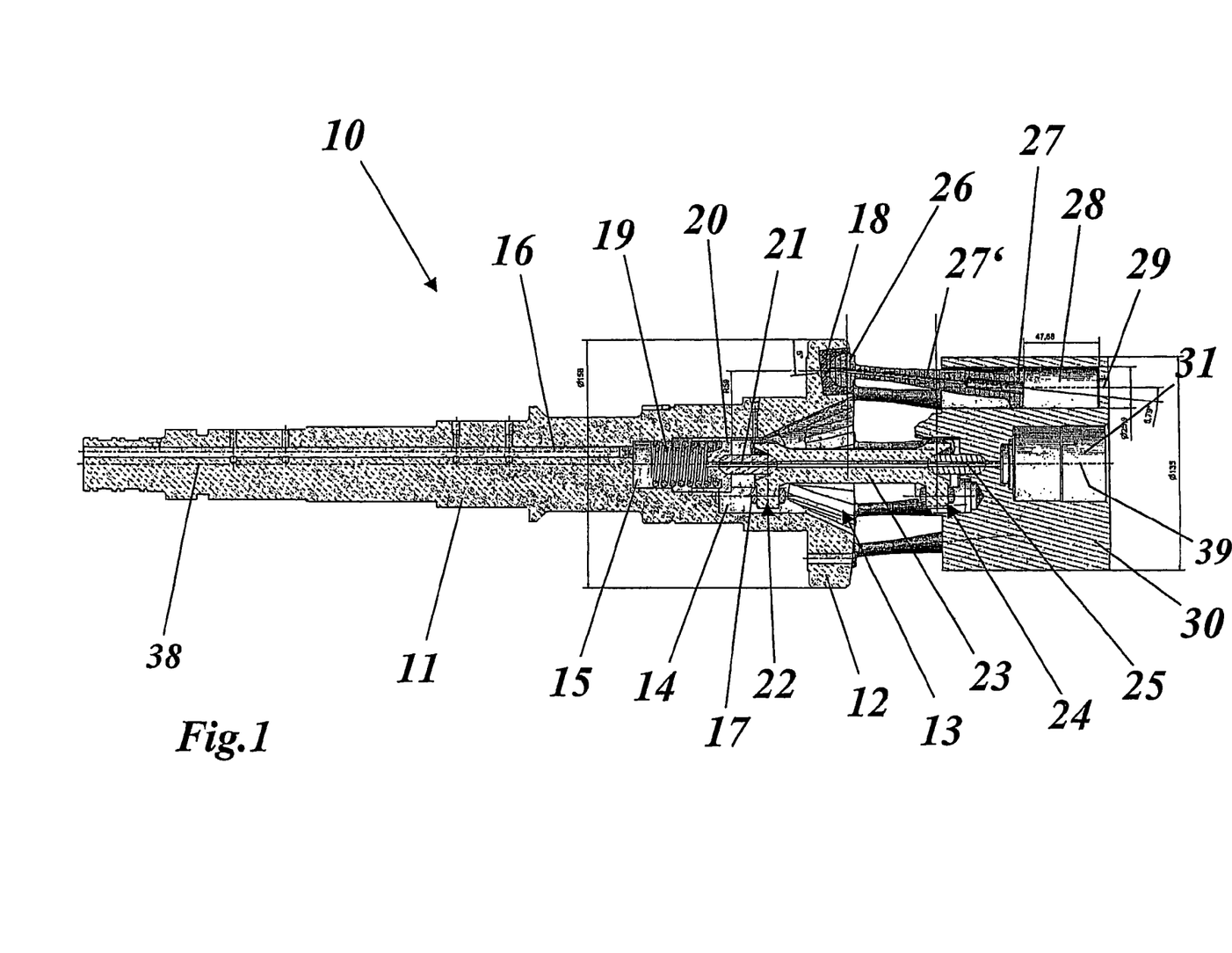
FIG. 1 shows a longitudinal section through a hydrostatic axial piston machine with an unpivoted cylinder block according to a preferred exemplary embodiment of the invention.
Figure 7:
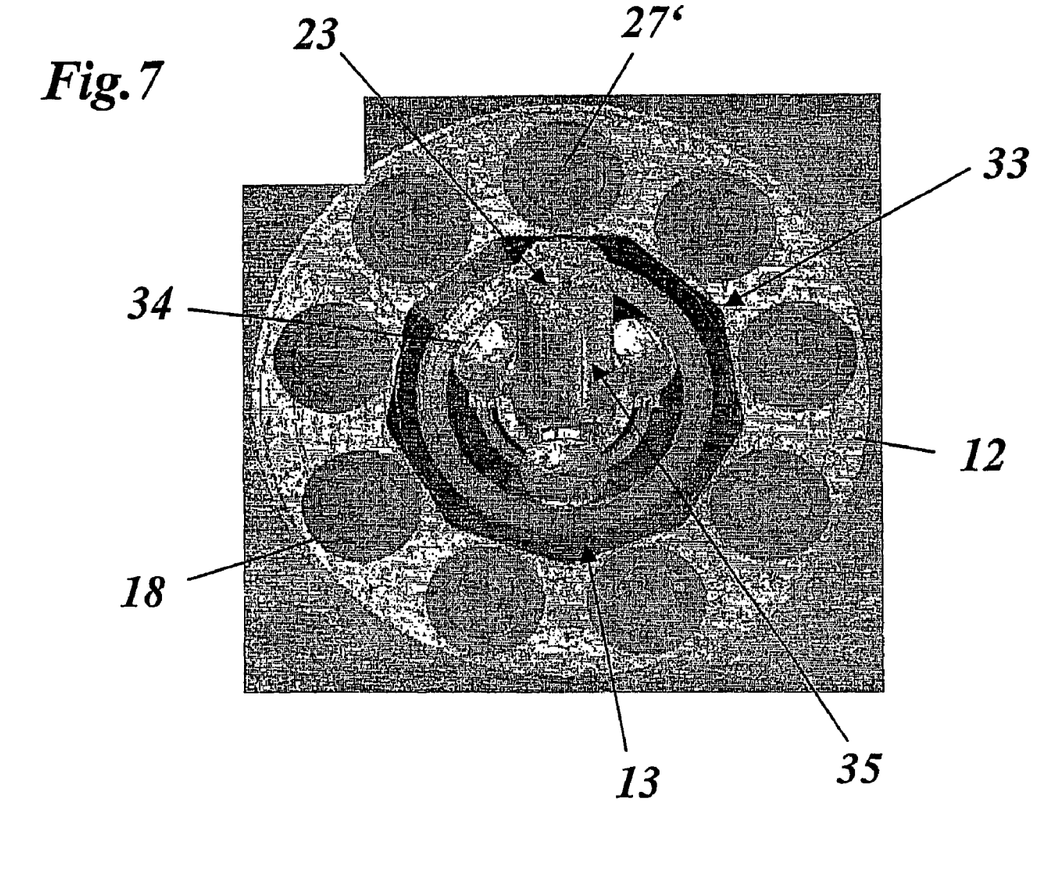
FIG. 7 shows a top view of the position of the synchronizing shaft in the funnel-shaped orifice at the moment of rotation, where one of the groove-shaped recesses of the synchronizing shaft lies, in width, parallel to one of the sides of the nonagonal funnel.

FIG. 1 illustrates a longitudinal section through a hydrostatic axial piston machine with an unpivoted cylinder block (pivot angle $\alpha=0$) according to a preferred exemplary embodiment of the invention. The hydrostatic axial piston machine 10 comprises an elongate driven shaft 11, a cylinder block 30, a plurality of pistons 27 and a synchronizing shaft 23 for synchronizing the rotations of the driven shaft 11 and cylinder block 30. The driven shaft 11 is subdivided over its length into differently machined portions which serve for mounting the shaft, for receiving transmission gearwheels and for receiving and actuating clutches when the hydrostatic axial piston machine 10 is part of a power-branched transmission, as illustrated diagrammatically by an example in FIG. 7.

Figure 4:
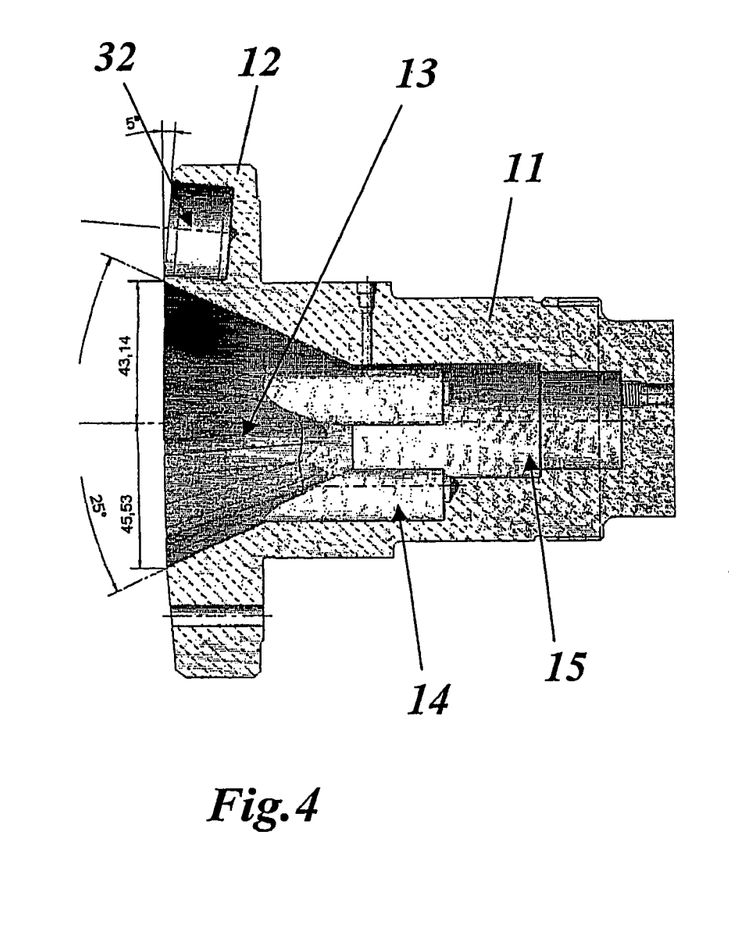
FIG. 4 shows a longitudinal section through an enlarged illustration of the head part of the driven shaft of the machine from FIG. 1 with the clearances for one tripod joint and the synchronizing shaft.

At one end, which faces the cylinder block 30, the driven shaft 11 is thickened and ends in a flange 12 concentric to the axis 38 of the driven shaft 11. Nine circular-cylindrical bearing receptacles 32 are milled, uniformly distributed about the axis 38 on a reference circle, into the end face of the flange 12 (see also FIGS. 4 and 5), spherical bearings 18 for the pivotable mounting of the pistons 27 being inserted into said bearing receptacles 32. The axes of the bearing receptacles 32 are tilted a few degrees (for example, 5°) radially outward in relation to the axis 38 of the driven shaft 11. The end face of the flange 12 is correspondingly machined to descend outward, so that, in the region of the bearing receptacles 32, it runs perpendicularly with respect to the axes of these.

In the center of the flange 12 is provided a funnel-shaped orifice 13 (FIGS. 4, 5) which merges further on, inside the driven shaft 11, into a central bore 15 of stepped diameter. Three axially parallel bores 14, which are part of a first tripod joint 22, are introduced into the driven shaft 11 around the bore 15, and so as to overlap partially with the bore 15, and are arranged in each case so as to be rotated through 120°. Comparable bores are present, opposite them, in the cylinder block 30 and are part of a second tripod joint 24. The two tripod joints 22 and 24 allow a rotationally fixed coupling of the synchronizing shaft 23 to the driven shaft 11 and to the cylinder block 30, while at the same time ensuring a pivotability of the cylinder block 30 in relation to the flange 12 or the driven shaft 11. For this purpose, according to FIG. 6, the synchronizing shaft 23 is equipped at each of the two ends with three radially oriented cylindrical tenons 34 which are arranged so as to be rotated through 120° and which, in the case of the first tripod joint 22, extend from the central bore 15 through the laterally open overlap region into the adjacent bore 14. A comparable engagement of the tenons 34 also takes place in the second tripod joint 24. To reduce the play, in each case rings 17 (FIG. 1), which are crowned on the outside, are drawn onto the tenons 34.

When the cylinder block 30 is pivoted with respect to the flange 12, the distance to be bridged between the cylinder block 30 and the flange 12 by the synchronizing shaft 23 changes. So that this distance change can be compensated, the synchronizing shaft 23 is mounted displaceably in the axial direction in the region of the first tripod joint 22. The synchronizing shaft 23 is seated with its end facing the cylinder block 30 pivotably on a first pressure pin 25 which is inserted into the cylinder block 30 and which projects with a portion of its length out of the cylinder block 30. So that the synchronizing shaft 23 does not come out of engagement with the cylinder block in the second tripod joint 24, it is pressed against the second pressure pin 25 in the axial direction with prestress. A compression spring 19 accommodated in the bore 15 serves for generating the prestress and presses onto the synchronizing shaft 23 via an axially displaceable pressure piston 20 and a second pressure pin 21. The pressure piston 20, pressure pins 21, 25 and synchronizing shaft 23 have in each case a central oil duct.

Figure 2:
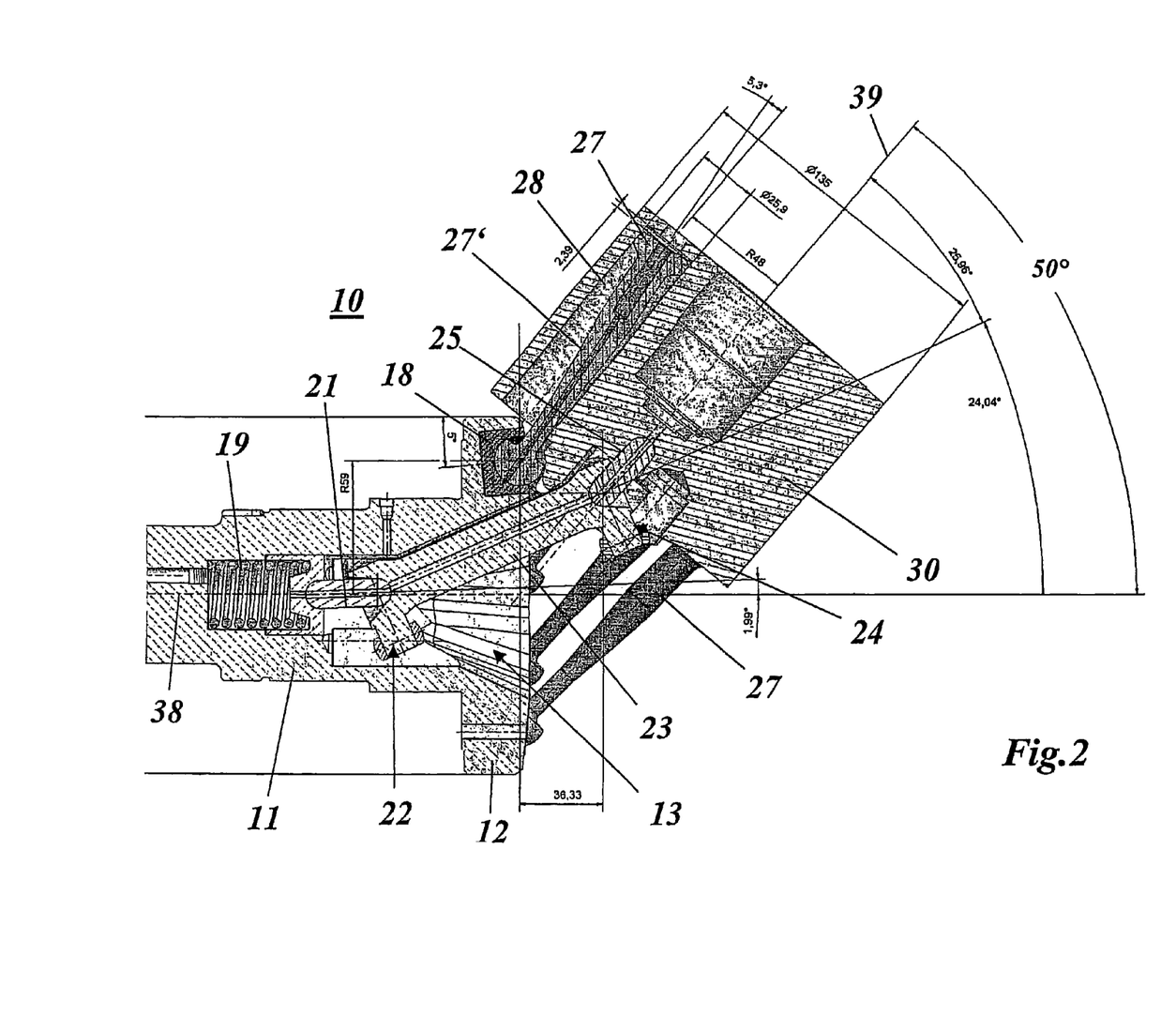
FIG. 2 shows a detail of the hydrostatic axial piston machine from FIG. 1 with the cylinder block pivoted through +50°.
Figure 5:
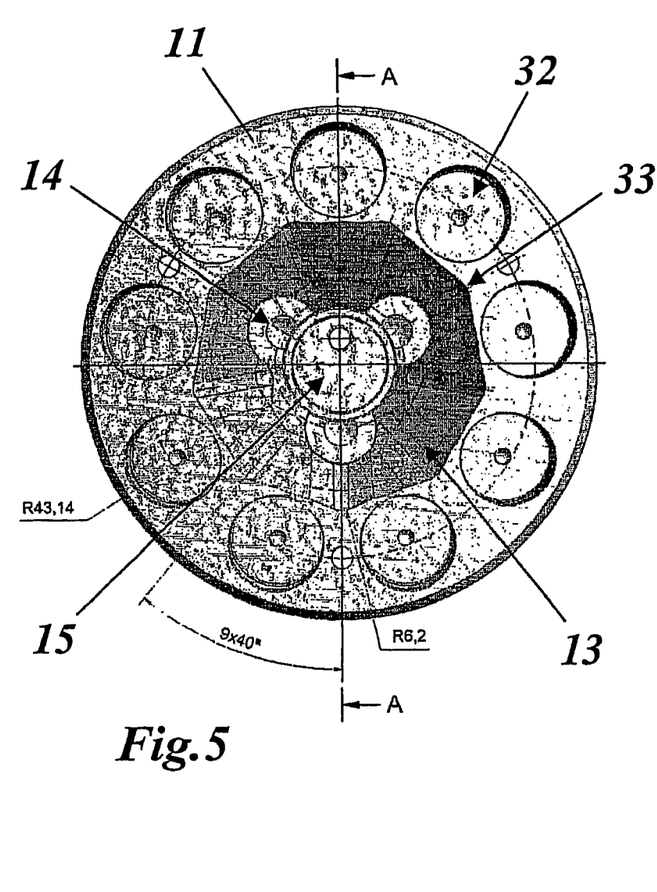
FIG. 5 shows a top view of the head part of the driven shaft from FIG. 4 in the axial direction.
Figure 6:
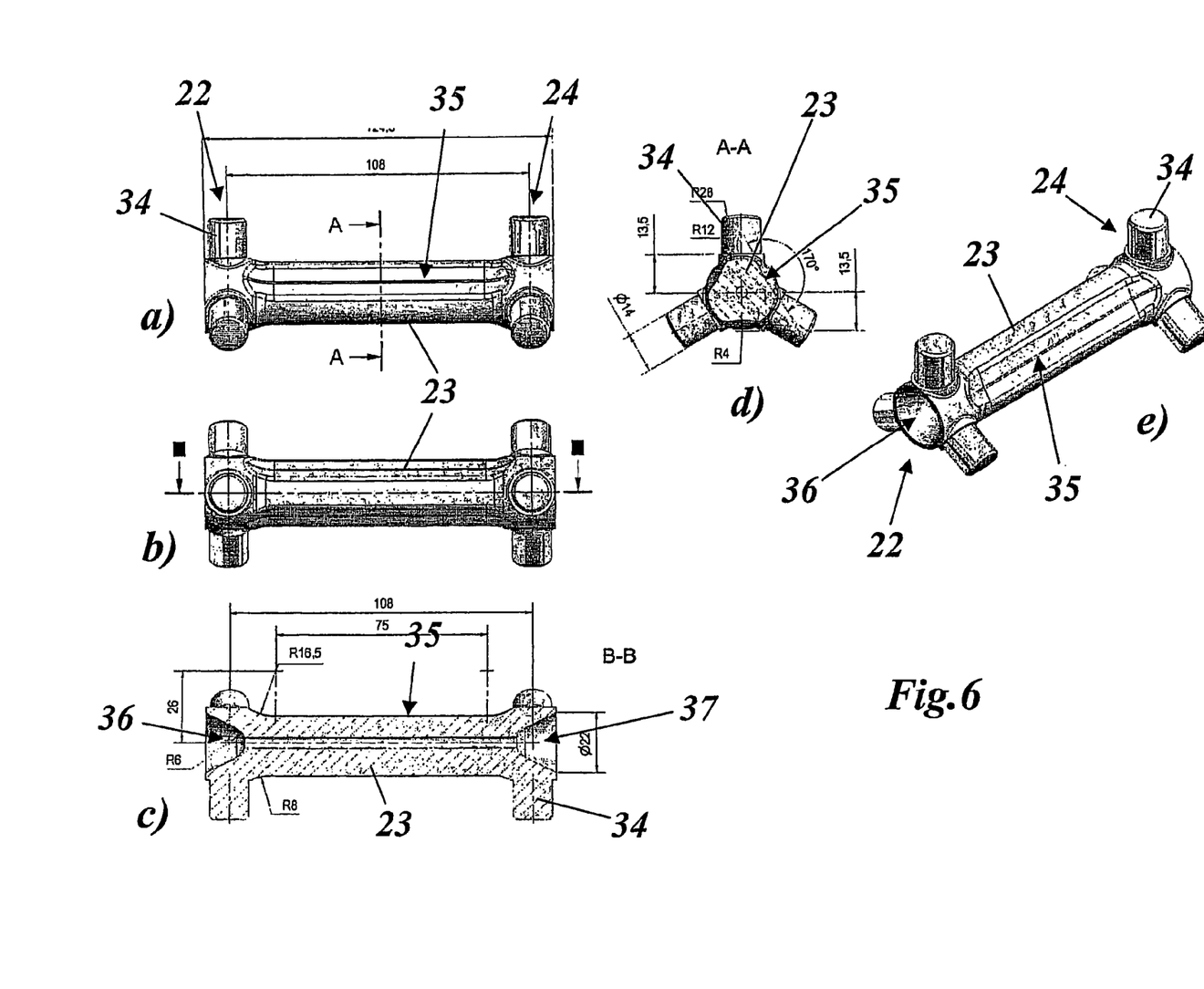
FIG. 6 shows, in several part figures a) to e), various views of the synchronizing shaft from FIG. 1 with the recesses on the shank and the tenons, formed at both ends, for the tripod joints, FIGS. 6a and b showing side views, FIG. 6c showing a longitudinal section in the plane B-B from FIG. 6b, FIG. 6d showing a cross section in the plane A-A from FIG. 6a and FIG. 6e illustrating a perspective side view.

The (cylindrical) cylinder block 30 has nine axially parallel cylinder bores 28 which are distributed uniformly about its axis 39 on a reference circle and which, like the bearing receptacles 32 of FIG. 5, are in each case at an angular distance of 40° from one another. The cylinder bores 28, which have a diameter of about 26 mm in the example shown, are designed from the side facing the flange 12 as blind bores. The pistons 27, which are mounted pivotably in the flange 12, penetrate from this side into the cylinder bores 28. For this purpose, each piston 27 has an elongate downwardly tapering piston shank 27' which merges at the lower end into a spherical head 26, by means of which it is mounted pivotably in the associated spherical bearing 18. When the cylinder block 30 is pivoted upward out of the position shown in FIG. 1 (pivot angle $\alpha=0$), as illustrated in FIG. 2, the pistons 27 which lie above a mid-plane perpendicular to the drawing surfaces move further into their cylinder bores 28 and compress or displace through an orifice the medium located in these, whereas the pistons 27 lying below the mid-plane move further out of their cylinder bores 28 and expand the medium located in these or suck it in through an orifice. When the cylinder block 30 is pivoted downward according to FIG. 3, the pistons 27 lying above and below the mid-plane interchange their roles. The maximum piston stroke of the pistons 27 amounts to about 93 mm in the example shown.

When, in the case of a constant angle $\alpha=0$, the driven shaft 11 and consequently, via the synchronizing shaft 23, also the cylinder block 30 are rotated about their respective axes 38 and 39, each of the nine pistons 27 runs through a complete stroke cycle per revolution, the top and bottom dead centers in each case being run through when the pistons and cylinder bores are respectively at the upper and lower (for $\alpha>0$; see FIG. 2) or at the lower and upper (for $\alpha<0$; see FIG. 3) vertex point of the rotational movement. The hydrodynamic axial piston machine 10 can in this case operate as a hydraulic pump when a drive takes place via the driven shaft 11 and a hydraulic medium is sucked in at the pistons 27 moving out of the cylinder bore 28 and is pressed out by the pistons moving into the cylinder bore 28. The volumetric pumping capacity per revolution is in this case the higher, the larger the pivot angle $\alpha$ is. It may, however, also operate as a hydraulic motor when the cylinders are acted upon in each case, between top dead center and bottom dead center, with hydraulic medium which is under pressure, and the rotational movement occurring is picked up at the driven shaft 11. The torque is in this case the higher, the larger the pivot angle $\alpha$ is. If, by contrast, high rotational speeds are to be achieved at the driven shaft 11, the pivot angle $\alpha$ must be made small. In a power-branched transmission 40, as illustrated diagrammatically in FIG. 7, the hydraulic power branch is formed by two hydrostatic axial piston machines H1 and H2 of the type shown in FIG. 1 which are connected hydraulically to one another and which operate selectively as a pump and as a motor, depending on the speed range.

The working space in the cylinder bores 28 which is delimited by the pistons 27 is accessible from the outer end face of the cylinder block 30 through connecting orifices 29. For activating the individual cylinders, there serves a rotationally fixed control disk, not illustrated in FIGS. 1 to 3, with corresponding orifices, on which the cylinder block 30 is supported axially with the outer end face via a plain bearing (a bearing bore 31 is provided for radial mounting in the cylinder block 30). Details of such a control are known and may be gathered from the publications initially mentioned. The same applies to the pivoting mechanism which is required in order to pivot the cylinder block 30 through the desired pivot angle $\alpha$ with respect to the flange 12.

The hydrostatic axial piston machines known hitherto, such as are described in the publications initially mentioned, have a pivoting range which is limited by a maximum pivot angle $\alpha_{max}$ of 45°. As a result, the piston stroke per cylinder is limited, and consequently—with the overall size remaining the same—also the range of adjustment for the power. This leads, in particular to restrictions when the hydrostatic axial piston machines are to be used in power-branched transmissions. In the hydrostatic axial piston machines according to the present invention, this limitation is eliminated in that maximum pivot angles $\alpha_{max}$ of greater than 45°, preferably of up to 50°, are implemented.

Figure 3:
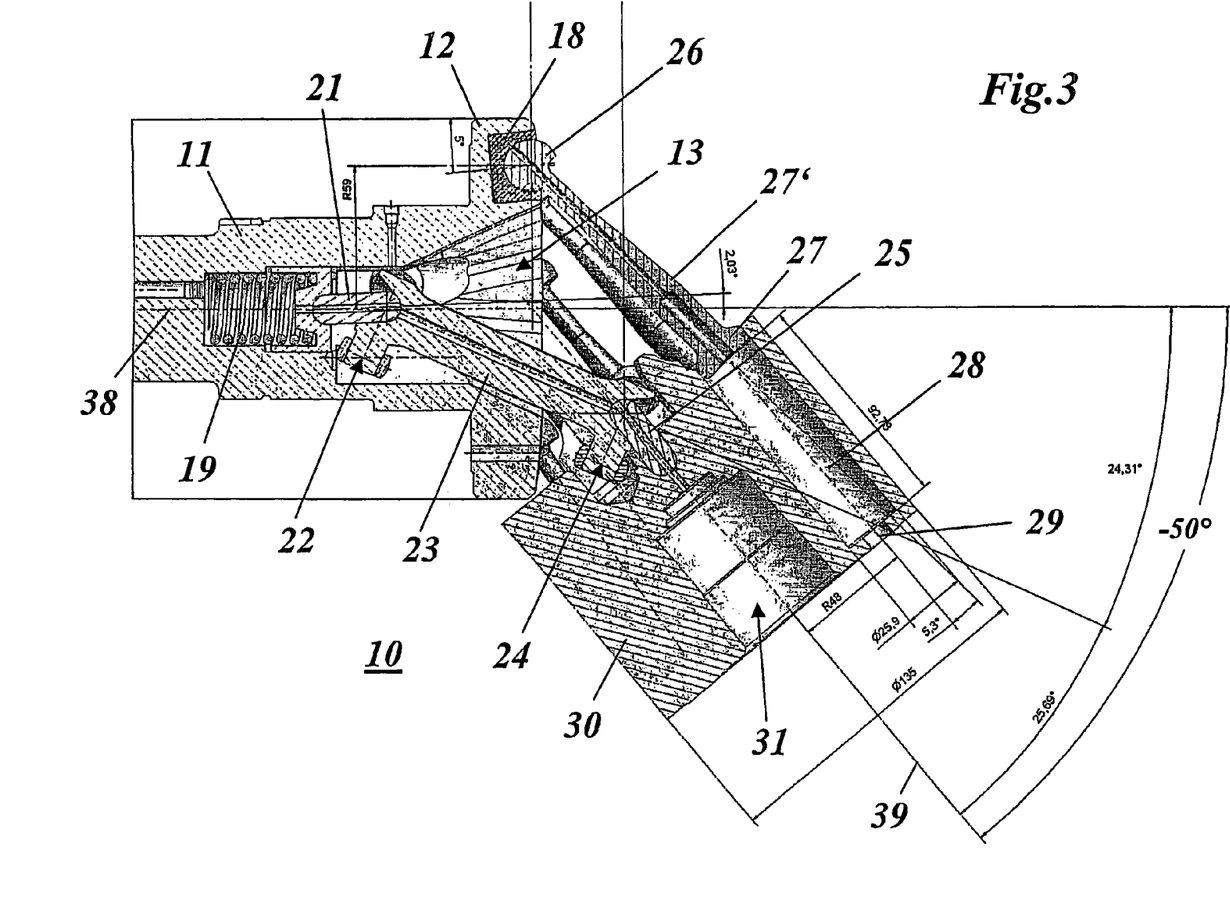
FIG. 3 shows a detail of the hydrostatic axial piston machine from FIG. 1 with the cylinder block pivoted through −50°.

A substantial limitation for the maximum pivot angle $\alpha_{max}$ of a hydrostatic axial piston machine according to FIG. 1 to 3 is afforded by the synchronizing mechanism between the driven shaft 11 and cylinder block 30. When the cylinder block 30 is pivoted through the pivot angle $\alpha$, the synchronizing shaft 23 pivots out of the axis 38 of the driven shaft by about half the pivot angle. In order to provide room for this pivoting, according to FIGS. 4 and 5, in the center of the bearing receptacles 32 arranged on a reference circle the funnel-shaped orifice 13 is provided, the opening angle of which determines the pivoting range of the synchronizing shaft 23. In the known hydrostatic axial piston machines, the orifice 13 has a conical design. The width of the orifice is then determined by a circle which is inscribed in the bearing receptacles 32. In the present solution, by contrast, the space present between the adjacent bearing receptacles 32 is utilized in order to increase the possible pivoting range of the synchronizing shaft 23. For this purpose, according to FIG. 5, in the angular range between adjacent bearing receptacles 32 bulges 33 are provided in the orifice, which extend beyond the inscribed circle. At the same time, according to FIG. 6d, the cross-sectional contour of the synchronizing shaft 23 is varied, deviating from the circle, such that, in cooperation with the bulges 33 in the orifice 13, an increased pivoting range is obtained for the synchronizing shaft 23. In this case, when the axial piston machine rotates, the synchronizing shaft 23 rolls in the manner of a gearwheel in a ring wheel on the edge contour, provided with the bulges 33, of the orifice 13.

The edge contour of the orifice 13 may basically be of wavy configuration, the wave crests lying between the bearing receptacles 32 and the wave troughs being arranged directly at the bearing receptacles 32. Preferably, according to FIG. 5, the edge contour of the funnel-shaped orifice 13 is a polygon with a number of corners corresponding to the number of pistons 27, that is to say a nonagon, the corners of the polygon being arranged in each case between adjacent pistons 27 or bearing receptacles 32 and forming a bulge 33. By contrast, the cross-sectional contour of the synchronizing shaft 23 has a rotational symmetry which merges into itself as a result of rotation through 120°. This 120° rotational symmetry is generated by three groove-shaped recesses 35 in the synchronizing shaft 23 which run in the axial direction and are arranged in each case so as to be rotated through 120°. The ribs of the synchronizing shaft 23 which remain standing between the groove-shaped recesses penetrate synchronously into the bulges 33 of the orifice 13 in the case of corresponding angular orientation of the tripod joint 22, when the synchronizing shaft rolls on the wall of the orifice 13 at a maximum pivot angle $\alpha_{max}$. On account of the 120° symmetry of the synchronizing shaft 23 and of the 40° symmetry of the orifice 13, penetration takes place only at every third bulge 33. A snapshot of the rolling operation, in which one of the groove-shaped recesses 35 of the synchronizing shaft 23 lies, in width, exactly parallel to one of the sides of the nonagonal funnel 13, is reproduced in FIG. 7.

Figure 8:
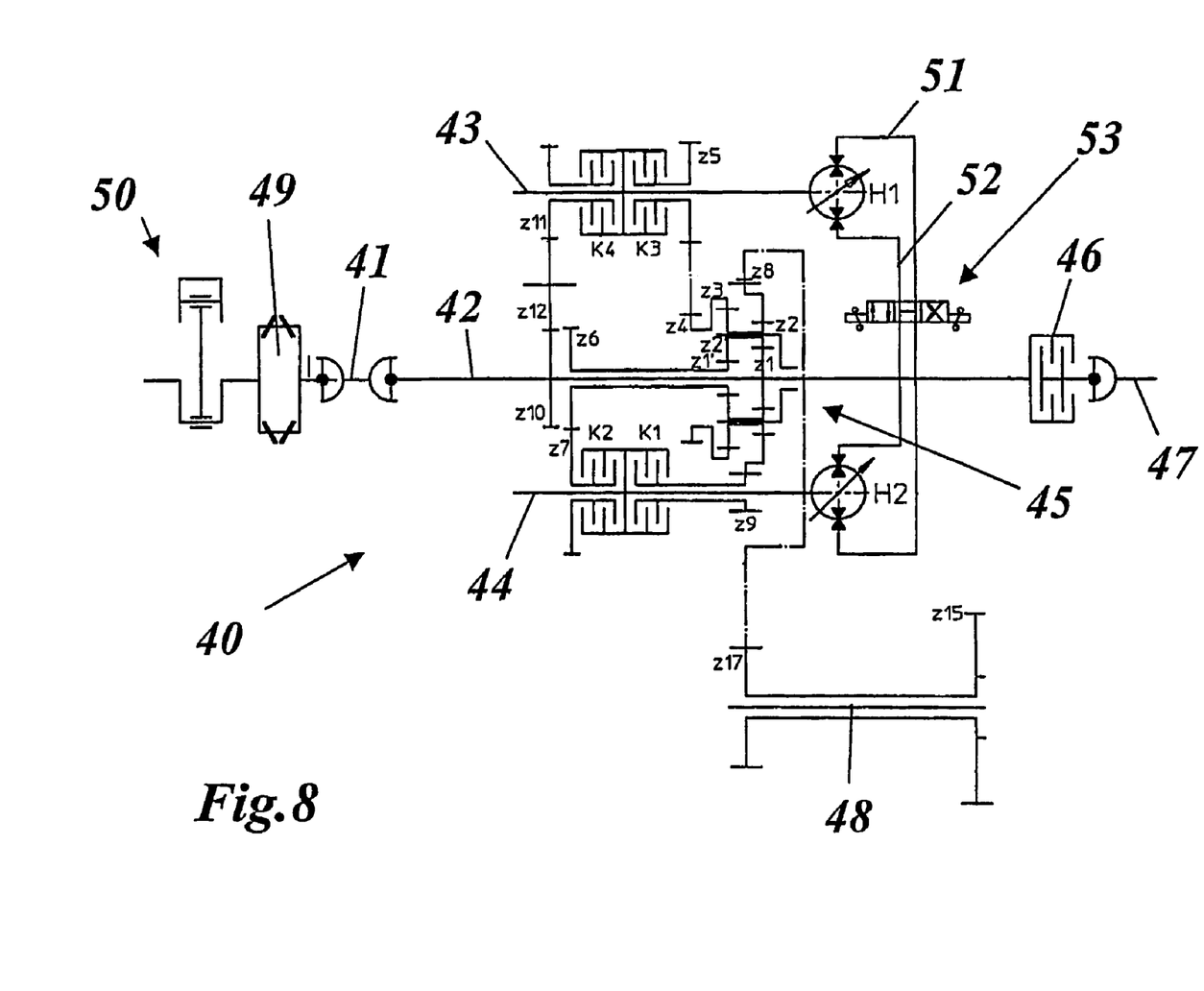
FIG. 8 shows an abstract diagram of an illustrative power-branched transmission for a tractor with two hydrostatic axial piston machines according to FIG. 1-6 operating selectively as a pump and as a motor.
Figure 9:
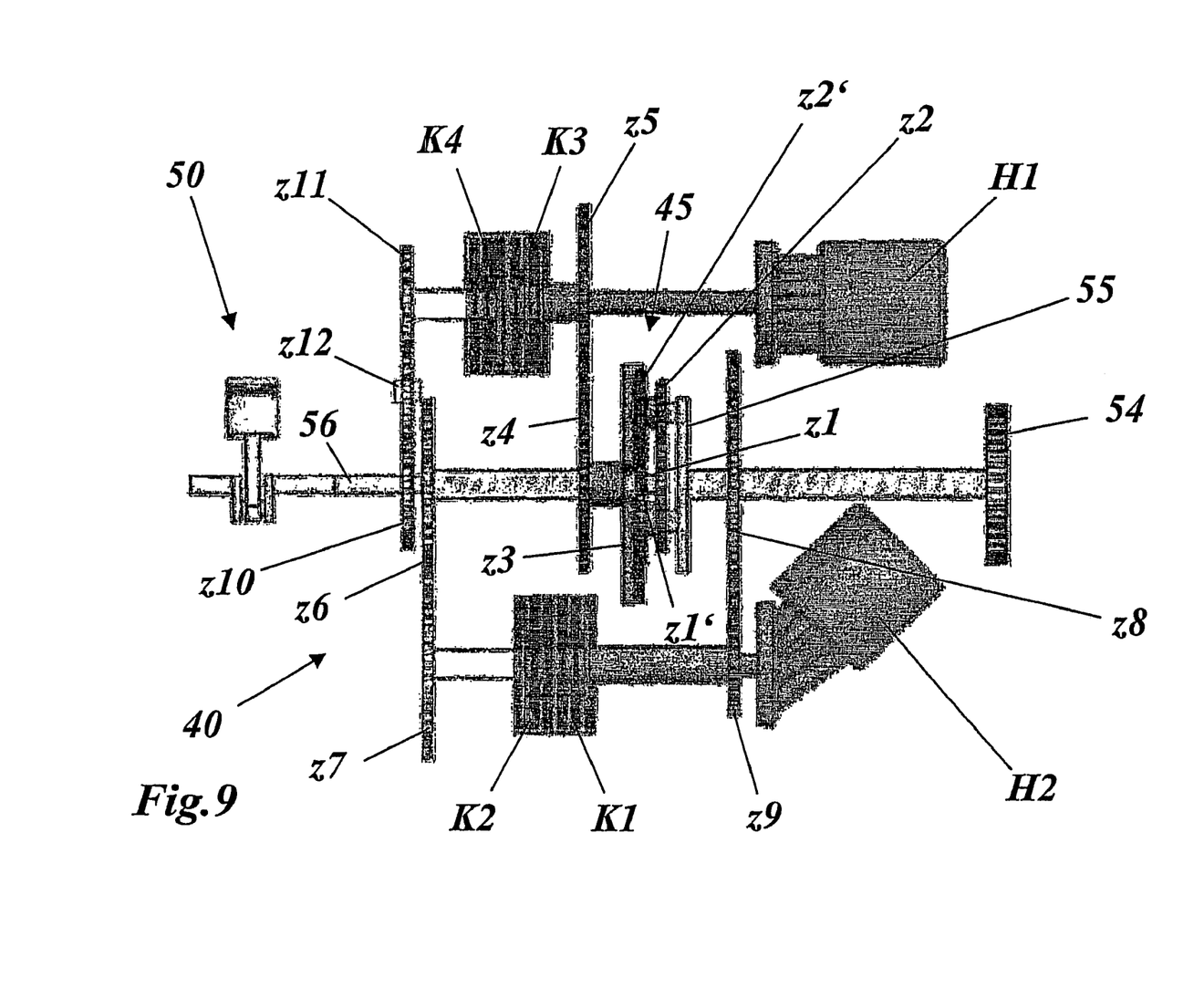
FIG. 9 shows a greatly simplified transmission according to the diagram of FIG. 8, but without a continuous take-off shaft.

On account of the broadened pivoting range, the hydrostatic axial piston machine according to FIG. 1 to 3 is particularly suitable for use in a power-branched transmission of a vehicle, in particular a tractor, which is driven by an internal combustion engine (diesel engine) and in which, on the one hand, a high torque has to be provided in a low driving speed range and, on the other hand, higher driving speeds are to become possible with good efficiency. A diagram of such a power-branched transmission is reproduced in FIG. 8, and a greatly simplified transmission according to the diagram of FIG. 8 is shown in FIG. 9 (in this case, however, the continuous take-off shaft 42 of FIG. 8 is replaced by a drive shaft 56 ending in the stepped planetary gear 45; the torsion damper 49 is likewise absent). The power-branched transmission 40 illustrated is connected via a cardan shaft 41 and a torsion damper 49 to an internal combustion engine 50 which is symbolized by a piston/cylinder arrangement. A take-off shaft 42 runs through the power-branched transmission 40 and is connected at one end directly to the cardan shaft 41 and at the other end can be connected to a driven shaft 47 via a clutch 46. Where a tractor is concerned, agricultural accessories can be driven by means of the driven shaft 47.

Seated on the take-off shaft 42 is the large sun wheel z1 of a stepped planetary gear 45 which comprises additionally double planet wheels z2, z2', a small sun wheel z1' and a ring wheel z3. The small sun wheel z1' is connected fixedly in terms of rotation via a hollow shaft to a further gearwheel z6 which meshes with a gearwheel z7. The ring wheel z3 is connected fixedly in terms of rotation to a gearwheel z4 which, in turn, meshes with a gearwheel z5. The gearwheel z5 can be connected via a clutch K3 to the driven shaft 43 of a first hydrostatic axial piston machine H1. The gearwheel z7 can be connected via a clutch K2 to the driven shaft 44 of a second hydrostatic axial piston machine H2. The planet carrier (55 in FIG. 8) of the double planet wheels z2, z2' is connected fixedly in terms of rotation to a gearwheel z8 which meshes, on the one hand, with a gearwheel z9 and, on the other hand with a gearwheel z17. The gearwheel z9 can be connected by a hollow shaft and a clutch K1 to the driven shaft 44 of the second hydrostatic axial piston machine H2. The gearwheel z17 is part of a drive train 48 which is connected to the driven axles of the vehicle. In the transmission of FIG. 9, the power for vehicle propulsion is picked up at a corresponding driven wheel 54. The powers transferred via the mechanical and hydraulic branches of the transmission are summed up at the planet carrier 55. Furthermore, the take-off shaft 42 has seated on it fixedly in terms of rotation a gearwheel z10 which can be connected to the driven shaft 43 of the first hydrostatic axial piston machine H1 via an intermediate gearwheel z12 and a further gearwheel z11 by means of the clutch K4.

The two hydrostatic axial piston machines H1 and H2 are connected hydraulically to one another via two hydraulic lines 51 and 52 which are used in each case as an outward and a return line. A multiway valve 53 inserted into the hydraulic lines 51, 52 makes it possible to interchange the lines when the two axial piston machines H1 and H2 exchange their roles, that is to say when the axial piston machine operating as a pump is to operate as a motor, and vice versa.

The mode of action of the power-branched transmission 40 from FIG. 8 or FIG. 9 can be explained with reference to the part figures of FIG. 10. The part figures a1 to a3 relate in this case to a first forward driving step, the part figures b1 to b3 relate to a second forward driving step and the part figure c relates to reverse drive. For reasons of space, the designations of the individual transmission parts which are identical to the designations of FIG. 9 are omitted.

At the commencement of the first forward driving step (slow forward drive; FIG. 10(a1)), the clutches K1 and K2 are engaged. The first hydrostatic axial piston machine H1 operates, in the first forward driving step, as a pump and the second hydrostatic axial piston machine H2 as a motor. The axial piston machine H1 (pump) is first pivoted slowly out of the unpivoted state (pivot angle $\alpha=0$) into the fully pivoted state (pivot angle $\alpha=\alpha_{max}$) which is reached in part FIG. 10(a2). It thereby pumps more and more hydraulic fluid into the axial piston machine H2 operating as a motor. The latter is pivoted to the maximum and therefore outputs a high torque at a slowly rising rotational speed. When the axial piston machine H1 is pivoted to the maximum (FIG. 10(a2)), the axial piston machine H2 is pivoted slowly back to zero (FIG. 10(a3)). In this case, its rotational speed rises, while the rotational speed of the axial piston machine H1 and the transferring hydraulic power falls to zero at the end of the driving step. In FIG. 11, the first forward driving step corresponds to the speed range of between 0 and about 18 km/h, in which the fraction HP of transferred hydraulic power decreases linearly from 100% to 0%.

Figure 10:
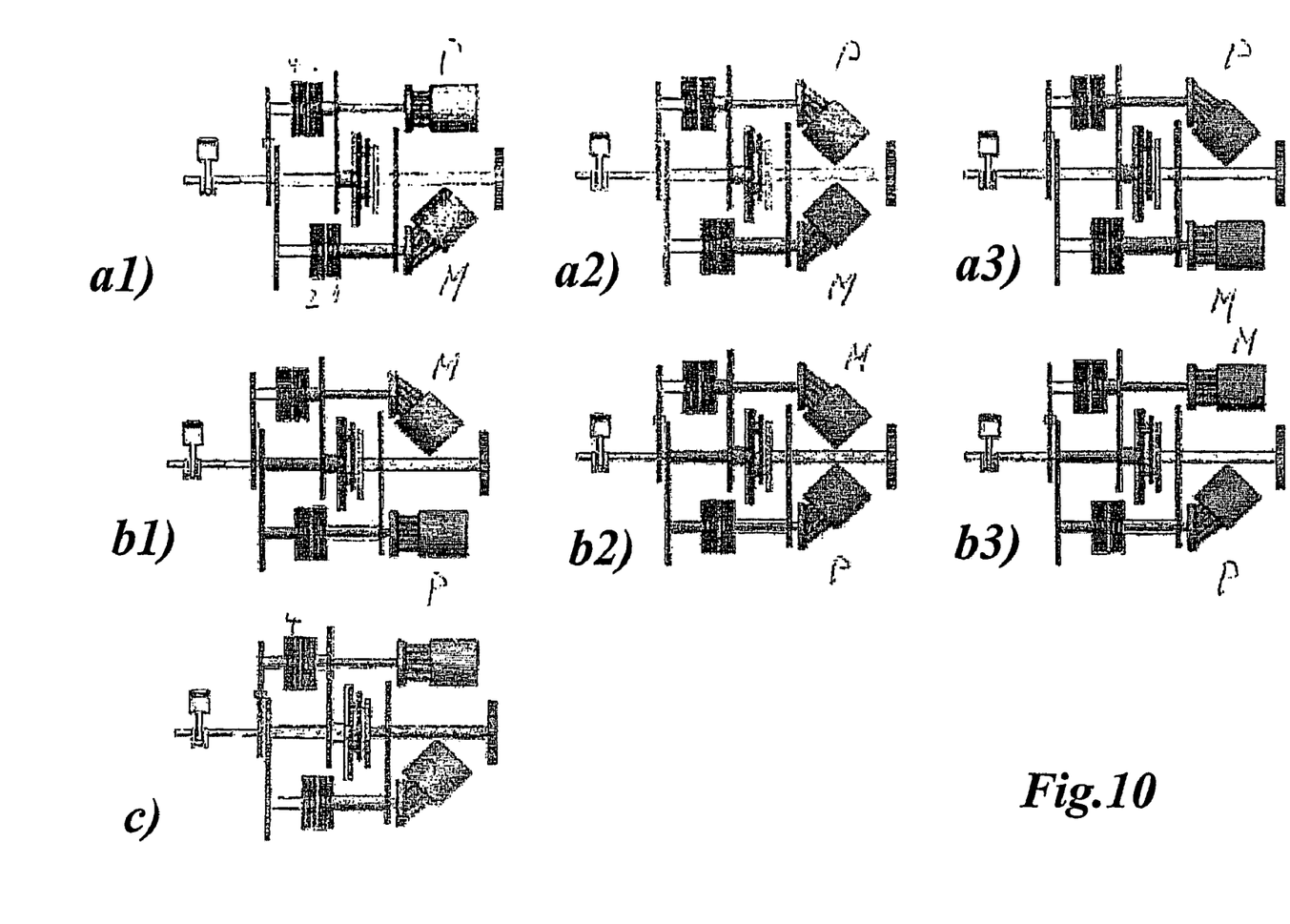
FIG. 10 shows, in various part figures FIG. 10(a1) to FIG. 10(c), the various shift positions of the transmission according to FIG. 9 in the first forward driving step (FIGS. 10(a1)-10(a3)), in the second forward driving step (FIGS. 10(b1)-10(b3)) and in reverse drive (FIG. 10(c))
Figure 11:
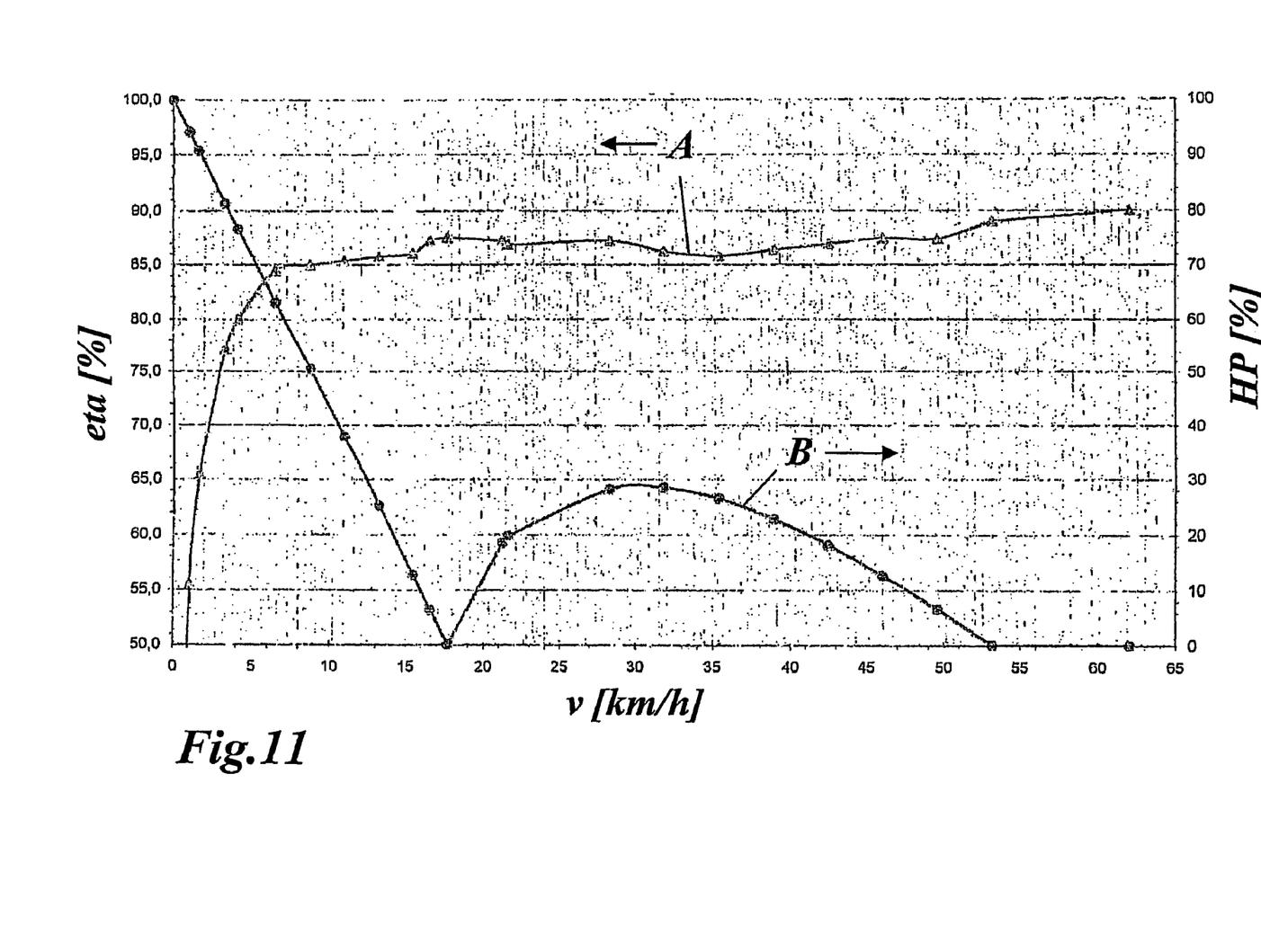
FIG. 11 shows the efficiency eta (curve A) and the percentage hydrostatic fraction of the power transfer (curve B) as a function of the driving speed v of the tractor with the power-branched transmission according to FIG. 8 to 10, in the case of a transmission input power of 195 kW at 1800 rev/min and a final speed of 62 km/h at 2100 rev/min.

At the transition from the end of the first driving step (FIG. 10(a3)) to the start of the second driving step (FIG. 10(b1)), the clutch K1 is disengaged and, instead, the clutch K2 is engaged. Since the axial piston machine H2 receives no torque in the case of a pivot angle of zero, the shift torque is virtually zero. Simultaneously with the actuation of the clutches K1 and K2, the axial piston machine H1 is changed over to motor operation and the axial piston machine H2 to pump operation by the changeover of the multiway valve 53. The same actions as in the first driving step then take place with a different ratio: first, with the motor H1 fully pivoted, the pump H2 is pivoted increasingly out of the un-pivoted state (FIG. 10(b1)), until it is likewise fully pivoted (FIG. 10(b2)). The motor H1 is then pivoted back to zero (FIG. 10(b3)), it increases its rotational speed, and the transferred hydraulic power drops to zero. The second forward driving step corresponds to the speed range of between 18 km/h and 62 km/h in FIG. 11. The fraction of transferred hydraulic power rises in this case from 0% first to a maximum of about 30% (at 30 km/h) and then falls to 0% (at about 53 km/h) and for the speed lying above this remains at 0%. This type of transmission construction and transmission control results, according to FIG. 11, in an efficiency eta of the transmission which rises at the start very quickly to values of above 85% and at the highest driving speeds even reaches its maximum of about 90%.

For reverse drive (FIG. 10(c)), the clutches K2 and K3 are opened and the clutches K1 and K4 are closed. The axial piston machine H1 operates as a pump and the axial piston machine H2 as a motor. The motor H2 is fully pivoted, while the pump H1 is pivoted from the pivot angle zero.

The invention claimed is:

1. A hydrostatic axial piston machine, comprising a cylinder block rotatable about a first axis and having a plurality of cylinder bores which are arranged on a reference circle concentric to the first axis and extending in the axial direction, and a plane which is rotatable about a second axis and on which a number, corresponding to the number of cylinder bores, of pistons penetrating displaceably into the associated cylinder bores are articulated pivotably on a second reference circle concentric to the second axis and form a belt, and also means for synchronizing the rotations of the cylinder block about the first axis and of the driven shaft about the second axis, the cylinder block and the driven shaft being continuously adjustable with their two axes between a first position, in which the two axes are parallel, and a second position, in which the two axes form with one another a maximum pivot angle different from zero, wherein the maximum pivot angle is greater than 45°;

wherein the rotatable plane is arranged at one end of a driven shaft rotating about the second axis, in that the synchronizing means comprise a central synchronizing shaft which is arranged within the belt of pistons and which is in rotationally fixed engagement at one end via a first joint with the driven shaft and at the other via a second joint with the cylinder block, and in that in order to achieve a pivot angle different from zero, the synchronizing shaft is pivotable on all sides in a central funnel-shaped orifice of the driven shaft, said orifice being arranged within the belt of pistons in such a way that the maximum pivot angle of the machine is determined decisively by the size and configuration of the funnel-shaped orifice and of the cross section of the synchronizing shaft;

wherein the edge contour of the funnel-shaped orifice is a polygon with a number of corners corresponding to the number of pistons, and in that the corners of the polygon are arranged in each case between adjacent pistons and form a bulge; and wherein, to increase the maximum pivot angle, the funnel-shaped orifice is widened locally in each case between adjacent pistons by means of bulges, and in that the cross-sectional contour of the synchronizing shaft is adapted to the bulges.

2. The hydrostatic axial piston machine as claimed in claim 1, wherein in that a number of pistons divisible by 3 is provided, and in that the cross-sectional contour of the synchronizing shaft has a rotational symmetry which merges into itself as a result of rotation through 120°.

3. The hydrostatic axial piston machine as claimed in claim 2, wherein the 120° rotational symmetry of the cross-sectional contour of the synchronizing shaft is generated by three groove-shaped recesses in the synchronizing shaft which run in the axial direction and which are arranged in each case so as to be rotated through 120°.

4. The hydrostatic axial piston machine as claimed in claim 2, wherein nine pistons are provided.

* * * * *